United States Patent [19]

Shibayama

[11] 4,303,528

[45] Dec. 1, 1981

[54] PURIFICATION TREATMENT OF A LIQUID WASTE

[75] Inventor: Daigoro Shibayama, Takasaki, Japan

[73] Assignee: Yamato Setsubi Koji Kabushiki Kaisha, Gunma, Japan

[21] Appl. No.: 117,738

[22] Filed: Feb. 1, 1980

[30] Foreign Application Priority Data

Feb. 21, 1979 [JP] Japan .................. 54/19575

[51] Int. Cl.³ .............................. C02F 3/06
[52] U.S. Cl. .................... 210/615; 210/621
[58] Field of Search ............ 210/17, 150, 151, 605, 210/615, 621, 622, 629, 630, 197

[56] References Cited

U.S. PATENT DOCUMENTS

| | | | |
|---|---|---|---|
| 2,188,162 | 1/1940 | Schulhoff | 210/615 |
| 3,210,053 | 10/1965 | Boester | 210/17 X |
| 3,371,033 | 2/1968 | Simmons et al. | 210/622 X |
| 3,486,795 | 9/1969 | Bye-Jorgensen et al. | 210/17 X |
| 3,732,160 | 5/1973 | Klock | 210/150 X |
| 4,126,544 | 11/1978 | Baensch et al. | 210/151 X |
| 4,137,171 | 1/1979 | Yokata | 210/150 |

*Primary Examiner*—Thomas G. Wyse
*Attorney, Agent, or Firm*—Jordan and Hamburg

[57] ABSTRACT

In purification of a liquid waste, the liquid waste material is introduced into a sedimentation tank, and the relatively heavy material settles within the tank and is converted into a sludge through anaerobic activity. The supernatant foul liquid waste from the sedimentation tank is introduced into a submerged bioaeration-beds tank, and the supernatant foul liquid waste descends to successively flow between a plurality of irrigated sheets positioned in superimposed spaced relation within the bioaeration-beds tank. The liquid waste from the bottom of the bioaeration-beds tank is returned to the upper region thereof by an oxygen-containing medium, and the returned liquid waste and the supernatant foul liquid waste descend together and successively flow between the irrigated sheets, whereby the downwardly flowing foul liquid waste is purified by the activity of aerobic micro-organisms in biomembranes formed on both sides of the irrigated sheets, the purified liquid being recovered from the bioaeration-beds tank.

5 Claims, 3 Drawing Figures

PURIFICATION TREATMENT OF A LIQUID WASTE

BACKGROUND OF THE INVENTION

The pollution of rivers, lakes, swamps, and seas is attributable to foul liquid wastes from factories, individual dwellings, restaurants, assembly halls, etc., and treatment apparatus for purifying such foul liquid waste into clear water by the activity of micro-organisms living in sludge have been used heretofore. Thus the present invention also relates to an improved method and apparatus for purifying a mixed foul liquid waste of human body wastes (fecal matter and urine) and miscellaneous liquid wastes discharged from the above places by the activity of micro-organisms.

In general, the treatment processes of foul liquid wastes include primary and secondary treatment processes, etc. According to the present invention, a sedimentation tank is used for the primary treatment process in which heavy, relatively large foul matter and dust are settled, and a submerged bioaeration-beds tank is used for the secondary treatment process in order to make the supernatant liquid separating out in the sedimentation tank purer and clearer. The apparatus for the secondary treatment process plays an important role; that is, the superiority or inferiority of its function determines the purification efficiency of the whole plant.

A thorough investigation of secondary treatment apparatus carried out by the present inventor has led to the invention for the following unique submerged bioaeration-beds tank. In the submerged bioaeration-beds tank, according to the present invention, a plurality of rectangular irrigated or medium sheets which are made of plastics, especially of polyvinyl chloride, or of asbestoscement and which form the bases for developing biomembranes are horizontally positioned parallel to one another at regular intervals above one another. According to the investigation carried out by the present inventor, the multiplication and activity of micro-organisms scarcely depend on the kind of the material of which the irrigated or medium sheets are made. The upper irrigated or medium sheet is mounted at its both sides and one end in close contact with three tank walls and a gap of several cm is formed between the other end and the remaining opposite tank wall. A gap is formed between the next irrigated or medium sheet and the opposite tank wall. Thus, the irrigated or medium sheets are staggered down through the tank to form gaps in a zigzag manner. The foul liquid waste from the sedimentation tank is charged at one end of the upper irrigated or medium sheet. The charge flows to the gap at the other end of the sheet where it falls to the next irrigated or medium sheet. Here it flows in the opposite direction to the gap on the opposite side from which it falls to the next irrigated or medium sheet. This continues down the bioaeration-beds tank to the bottom. In practice, the foul liquid waste fills the tank. The tank is equipped with air-lift pumps whereby the foul liquid waste is raised from the bottom section to the upper section and recirculated through the spaces between the individual irrigated sheets in a zigzag manner, as mentioned above.

A description will now be set forth as regards the activity of micro-organisms living in sludge. In the above-described submerged bioaeration-beds tank, when air is supplied by means of the air-lift pumps and oxygen is mixed therewith, and dissolved into the foul liquid waste by the agitation of small air-bubbles, allowing aerobic bacteria contained in the foul liquid waste to respire and promoting their multiplication, the microorganisms thus adhere to the irrigated or medium sheets to form biomembranes. The microorganisms multiply more and more by adsorbing and taking in the polluting matter contained in the foul liquid waste and exert their excellent purifying activity.

During this process the foul liquid waste is rapidly purified into clear water. It is for the purposes of generating as many biomembranes as possible by increasing the surface area and of improving the purification efficiency that the irrigated or medium sheets forming the bases for developing biomembranes are made laminar. In the submerged bioaeration-beds tank according to the present invention, the reason why the irrigated sheets are mounted horizontally and parallel to one another is to grow the biomembranes in a stable state and at the same time to make contact between the foul liquid waste and biomembranes adhering to both sides of each irrigated or medium sheet over and over again. Therefore, the foul liquid waste turbulently flowing into the tank comes in contact with the biomembranes during its circulation and recirculation from top to bottom and from bottom to top. On the other hand, the utilization of settlement action caused by gravity during the flowing of the foul liquid waste leads both to the promotion of the adsorption on the biomembranes and to the improvement in purification efficiency. As the results of these, suspended solids and sludge are hardly produced, and both B.O.D. (Biochemical Oxygen Demand) and C.O.D. (Chemical Oxygen Demand) are extremely low, which means excellent purification efficiencies. The reason why sludge is hardly produced is considered to be that the special bacteria within the bodies of the biomembranes adhering to the irrigated or medium sheets live on the biomembranes and that thus the multiplication of the bacteria balances with that of the biomembranes. Extremely low suspended-solids content is attributable to the facts that the biomembranes have a much greater adsorptive power and that the micro-organisms prey satisfactorily upon suspended solids. A microscopic examination of the biomembranes shows more fully that Vorticella and Opercularia representative of aerobic bacteria propagate in great quantities. Philodina and Podophrya representative of the bacteria preying upon biomembranes (bacteria) also coexist with the above-mentioned bacteria. Since biological activities are great, as stated above, enlarged irrigated or medium sheets facilitate both the improvement in purification capacities and the attainment of the effluent's B.O.D. of less than 10 p.p.m. This apparatus is applicable to any large-scale treatment, if enlarged.

DESCRIPTION OF THE PREFERRED EMBODIMENTS

Figure 1:
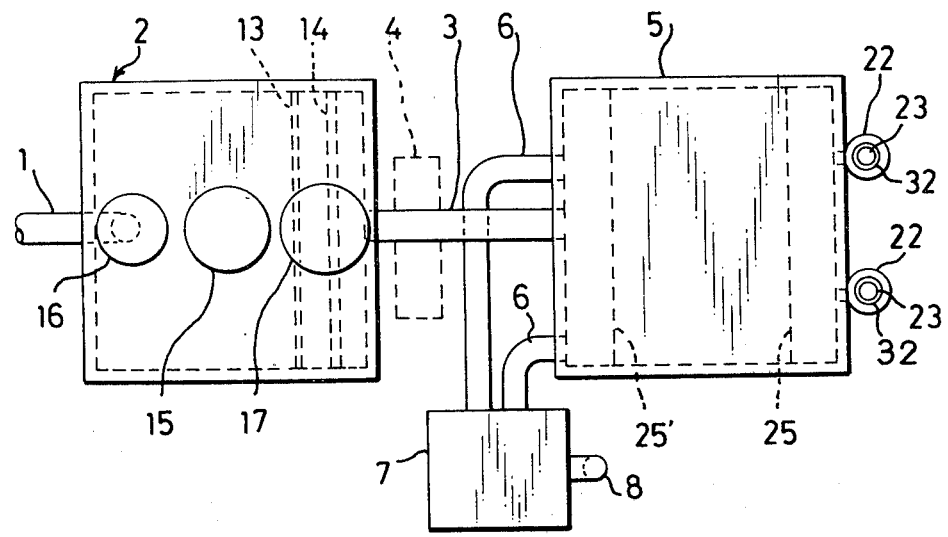
FIG. 1 is a schematic plan view of one embodiment of a plant according to the present invention.

Referring to the drawings FIG. 1 is an illustrative plan view of a plant according to one embodiment of the invention. The foul turbid liquid waste flows through a conduit 1 into a sedimentation tank 2, the supernatant liquid separating out therewithin flows through a transporting pipe 3 into a submerged bioaeration-beds tank 5 in which it is purified, and the purified liquid is discharged through a discharge pipe 6, a disinfection tank 7 and through an effluent pipe 8.

Figure 2:
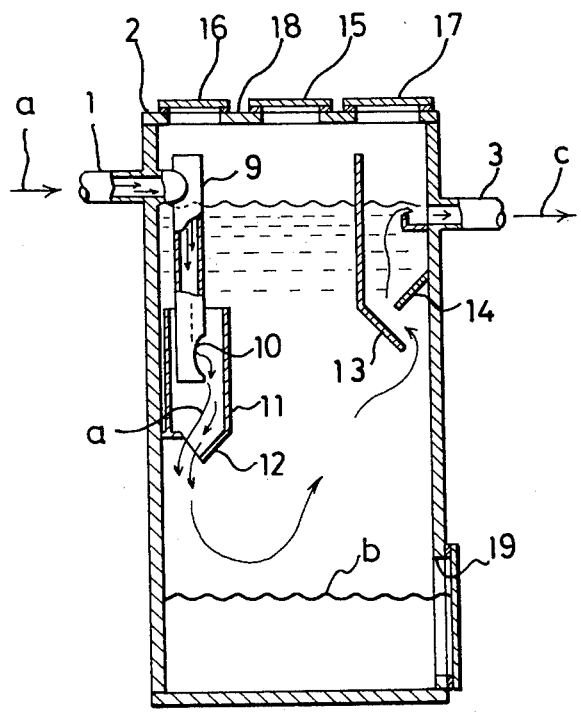
FIG. 2 is a schematic vertical longitudinal sectional view of the sedimentation tank according to the invention.

FIG. 2 is an illustrative vertical longitudinal sectional view of the sedimentation tank 2 according to the invention. The foul turbid liquid waste a flows through the conduit 1 into a fall pipe 9 of the sedimentation tank 2. The liquid waste falling through the fall pipe 9 exits the pipe 9 through a lower hole 10 made in it, impinges against a baffle plate 11 which has a lower side section facing the tank wall, flows slowly into the middle section of the tank, and collects therewithin.

During this collection, relatively heavy, large matter such as paper, garbage, etc., settles to the bottom to become the precipitate b. Since there is no oxygen supply to the body of the precipitate b, it is disintegrated into extremely finely divided particles by the activity of anaerobic micro-organisms to form sludge.

The lower hole 10 of the fall pipe 9 and the baffle plate 11 constitute a device serving to allow the foul turbid liquid waste to flow in slowly so that the precipitate b which has settled at the bottom is not disturbed by the flowing-in of the liquid waste.

The foul liquid waste collecting in the sedimentation tank 2 fills it to the level of the upper transporting pipe 3. The foul turbid liquid waste is charged through the conduit 1 into the sedimentation tank 2 in which the above-mentioned heavier matter settles, and the supernatant foul liquid waste c separating out flows between two weir plates 13 and 14 positioned at the upper section of the sedimentation tank 2 through the transporting pipe 3 into a submerged bioaeration-beds tank 5 located in the neighborhood of the sedimentation tank 2. Two inspection holes 15 and 16 and an air vent 17 are provided in a tank cover plate 18 of the sedimentation tank 2, and it is cleaned from time to time by drawing off the sludge through the inspection holes 15 and 16 by means of pumps.

The purpose of the weir plates 13 and 14 is to serve as baffle plates; that is to say, the weir plates 13 and 14 comprise a separating device which prevent those solids in the precipitate b which adhere to the gas bubbles produced during disintegration of the precipitate b, become buoyant and thereby move upward, from flowing through the transporting pipe 3 into the neighboring submerged bioaeration-beds tank 5, and to settle again the heavier solids flowing in together with the supernatant foul liquid c.

The solids carried upward by the adherent gas bubbles produced by disintegration of the precipitate b form scum on the surface. Although the scum which builds up on the surface sometimes constitutes a layer, it again settles when broken up by inserting bars through the inspection holes 15 and 16. Any air leaking in through gaps between the tank cover plate 18 and the tank walls and odor are exhausted through an air vent 17.

Figure 3:
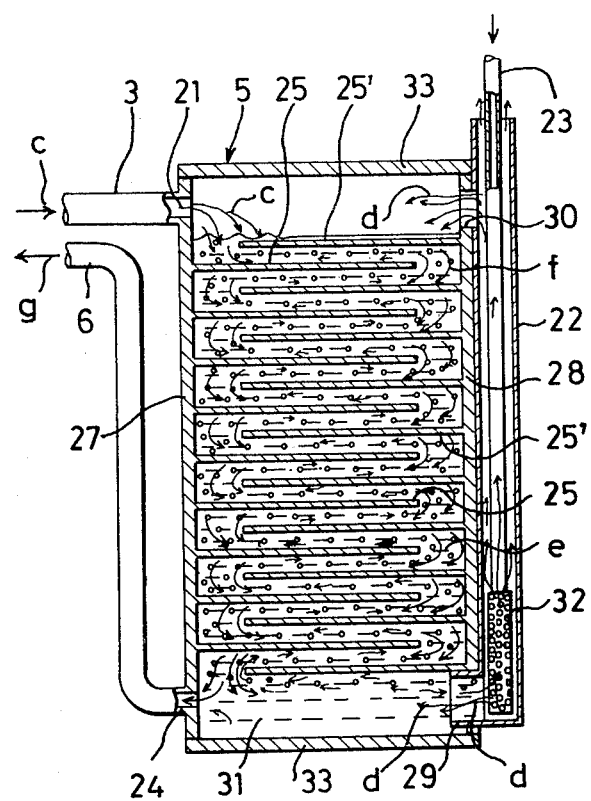
FIG. 3 is a schematic vertical longitudinal sectional view of the submerged bioaeration-beds tank according to the invention.

The supernatant foul liquid c leaving the sedimentation tank 2 and flowing through the transporting pipe 3 is introduced directly into the upper section of the submerged bioaeration-beds tank 5 through an inlet 21, as shown in FIG. 3. In the bottom section of the bioaeration-beds tank 5 there is provided a discharge hole 24 and the purified liquid is discharged through an external discharge pipe 6 attached thereto. The bioaeration-beds tank 5 is equipped on its outer side with air-lift pipes 22 leading from the bottom section to the upper section. A compressed-air pipe 23 is inserted into each of the air-lift pipes 22. The foul liquid d is returned from the bottom section to the upper section through the air-lift pipes 22 by the operation of air-lift pumps. As mentioned before, in the submerged bioaeration-beds tank 5, rectangular irrigated or medium sheets 25 and 25' of approximately 3 mm in thickness are horizontally mounted in a staggered manner above one another at regular intervals e.

The closed, box-shaped, submerged bioaeration-beds tank 5 is made in advance by:

(a) fixing a first group of a plurality of horizontal parallel irrigated sheets 25 and a second group of almost the same number of horizontal parallel irrigated sheets 25' perpendicularly at their one ends respectively to first and second tank walls 27 and 28;

(b) opposing in parallel relationship the first and second tank walls 27 and 28 to each other in such a way that the first group of the irrigated sheets 25 and the second group of the irrigated sheets 25' intervene relative to each other, that is, in such a way that the irrigated sheets 25 and 25' are positioned alternately at equal distances on either side of a middle line and at regular intervals e above each other; and (c) fastening the two remaining tank walls and covering plates 33 to the tank walls 27 and 28.

As mentioned above, the irrigated or medium sheets 25 and 25' are staggered, and the inverval e between the irrigated sheets 25 and 25' is made up to 3-10 cm so as to facilitate the flow of the foul liquid filling the tank. A gap (passage f) of approximately 4 to 8 cm is formed between the free end of each of the irrigated sheets 24 and 25' and the tank wall facing it.

The supernatant foul liquid c which has passed through the transporting pipe 3 enters through the inlet 21 into the submerged bioaeration-beds tanks 5 where it falls to the uppermost irrigated sheet 25' while dispersing, flows thereon while spreading horizontally and thereby contacts the air. The foul liquid flows to a passage f where it falls to the next irrigated sheet 25, and it flows in an opposite direction through the space e between the uppermost and next irrigated sheets 25 and 25' to the next passage f from which it falls to a third irrigated sheet 25. These alternate with each other until the foul liquid reaches the bottom section 31; namely, the supernatant foul liquid c which has entered into the upper section of the submerged bioaeration-beds tank 5 flows downwardly alternately through the spaces e between the irrigates sheets 25 and 25' and through the passages f to the bottom section 31 in a zigzag manner.

The foul liquid d which has reached the bottom section is elevated to the upper section of the tank through the air-lift pipes by the operation of the air-lift pumps and falls to the uppermost irrigated sheet 25' where it joins the above-mentioned foul liquid c. The mixed foul liquid incessantly flows downward through the individual spaces e between the irrigated sheets 25 and 25', as mentioned above.

When the level of the upper horizontal section of an external discharge pipe 6 connected to a discharge opening 24 in the bottom section is made to be slightly higher in elevation above the level of the uppermost irrigated medium sheet 25', the foul liquid can be circulated while the surface of the foul liquid filling the submerged bioaeration-beds tank 5 is kept high above the uppermost irrigated sheet 25'. Therefore, if the level of the upper horizontal section of the discharge pipe 6 is disposed to be above the level of the uppermost irrigated sheet 25' and to be slightly below the elevation of the transporting pipe 3, then the circulation is satisfactory.

The same quantity of the foul liquid d as that of the supernatant foul liquid c flowing from the sedimentation tank 2 through the transporting pipe 3 into the submerged bioaeration-beds tank 5 turns to the purified liquid, which is discharged through the discharge opening 24 and discharge pipe 6; that is to say, when the foul liquid d is recycled through the tank and the air-lift pipes are in a state that it fills the tank, then organic substances contained in the foul liquid d are disintegrated by the activity of the biomembranes formed on both sides of each of the irrigated or medium sheets 25 and 25' and thus it is purified.

While the present purifying plant is operated as described in the preceding example, it is preferable to install additionally a flow-regulating apparatus because the quantities of liquid wastes from kitchens, miscellaneous liquid wastes, human body wastes (fecal matter and urine) etc., vary with the season, day of the week, time, etc., and because a fluctuation of a combined liquid waste in its quality sometimes takes place as one of the accompaniments of the treatment for combining various kinds of foul liquid wastes; namely, it is possible to maintain the average mixing ratio and the average rate of flow by attaching a flow-regulating tank 4 with a flow meter to the transporting pipe 3 which provides liquid communication from the sedimentation tank 2 to the submerged bioaeration-beds tank 5, as shown in FIG. 1. Whereas in the operative example of the invention, a sedimentation tank 2 and a submerged bioaeration-beds tank 5 which are separate from each other are combined into a purifying plant, it is feasible to design either a purifying plant in which a tank is divided by an internal partition wall into two compartments; namely, a sedimentation tank and a submerged bioaeration-beds tanks, these two compartments communicating with each other, or one in which a sedimentation tank is placed upon a submerged bioaeration-beds tank, these two tanks communicating with each other. Such a purifying plant is able to carry out the method according to the present invention even in the case where floor space occupied by the plant is smaller.

The present invention is carried out as described above and the substantial advantages in carrying out the invention are as follows:

(a) The use of irrigated or medium sheets (laminar article) of high surface area results in a compact design for a plant for purification treatment, and the floor space occupied by the plant is thereby considerably reduced.

(b) Horizontal parallel irrigated or medium sheets lead to the stability in biomembranes, thus the biomembranes multiply very rapidly and do not come off. p (c) The content of suspended solids after a purifying treatment is smaller and sludge is scarcely produced during the purifying treatment. Plants for purifying treatment heretofore in use present difficulties in the disposal of the sludge produced in large quantities, and thus there is a large expense required for its disposal. The method and plant according to the present invention mitigates such conventional drawbacks and difficulties.

(d) The purification efficiency of the plant for purification treatment according to the invention hardly depends upon the atmospheric or liquid-waste temperature. According to the results of the investigation carried out by the present inventor, no decrease in the purification efficiency is recognized even in the cold season in which the atmospheric and liquid-waste temperatures are 0° C. and 4° to 5° C. respectively.

(e) Because no technical means is required for maintenance and management, they are simple and easy thus maintenance and management costs are lower. Operating costs also are lower compared with those in other treatment processes.

(f) The purification efficiency of the plant according to the invention is superior to that of known plants heretofore in use.

(g) The plant according to the invention is suitable also for a small-scale liquid-waste treatment as used in individual dwellings, small assembly halls, etc.

What is claimed is:

1. A process for purification of foul liquid waste material comprising introducing a mixture of human body waste materials and miscellaneous liquid waste material into a sedimentation tank, causing relatively heavy material to settle within the tank and converting said heavy material into a sludge through anaerobic activity, introducing supernatant foul liquid waste from said sedimentation tank into a submerged bioaeration-beds tank, causing said supernatant foul liquid waste to successively flow in one general horizontal direction, then to flow downwardly vertically, and then to flow in an opposite general horizontal direction in serpentine fashion, said alternate horizontal and vertical flow being effected by positioning in said bioaeration-beds tank a plurality of generally horizontally disposed and alternately foreshortened irrigated sheets in superimposed spaced array, returning foul liquid waste from the bottom of the bioaeration-beds tank to the upper region thereof by an oxygen-containing medium, causing said returned foul liquid waste and said supernatant foul liquid waste to flow together and successively flow on and between said horizontally disposed irrigated sheets, whereby the horizontally and downwardly flowing foul liquid waste is purified by the activity of aerobic microorganisms in biomembranes formed on said generally horizontally disposed irrigated sheets, and recovering purified liquid from said bioaeration-beds tank.

2. A process according to claim 1, wherein the foul liquid waste returned from the bottom of said bioaeration-beds tank to the upper region thereof is conveyed by compressed air.

3. A process according to claim 1, wherein oxygen is dissolved in said foul liquid waste at least during the conveyance thereof from the bottom to the upper region of said bioaeration-beds tank.

4. A process according to claim 1, wherein the purified liquid recovered from said bioaeration-beds tank is thereafter treated in a disinfection tank.

5. A process according to claim 1, wherein purified liquid is recovered from said bioaeration-beds tank through a discharge pipe having a portion thereof located above the elevation of the uppermost irrigated sheet within said tank, regulating the flow of supernatant foul liquid waste at a rate so as to maintain the level of foul liquid waste within the bioaeration-beds tank above the elevation of said portion of the discharge pipe.

* * * * *